Patented Jan. 11, 1949

2,458,823

UNITED STATES PATENT OFFICE 2,458,823

BENZOIC ACID DERIVATIVES

Souren Avakian, Oreland, Pa., assignor to The National Drug Company, Philadelphia, Pa., a corporation of Pennsylvania No Drawing. Application June 19, 1946,
Serial No. 677,898

2 Claims. (Cl. 260—472)

This invention relates to new derivatives of benzoic acid and more particularly refers to benzoates of beta-dialkyl-aminoethyl-beta-ethyl sulfide.

It is an object of this invention to produce a new class of benzoic acid derivatives. A further object is to produce benzoates of beta-dialkyl-aminoethyl-beta-ethyl sulfide. Additional objects will become apparent from a consideration of the following description and claims.

These objects and others are obtained in accordance with the present invention wherein benzoyl chloride, which may be further substituted with amino, nitro, alkyl, alkoxy, etc. groups, is reacted with beta-dialkylaminoethyl-beta-ethyl sulfide. The resulting product may be further treated to convert it to additional derivatives of these compounds. For instance, where para-nitrobenzoyl chloride is reacted with beta-diethylamino-beta-hydroxyethyl sulfide, the resulting product may be reduced to give the para-amino benzoate derivative.

The invention may be more readily understood by a consideration of the following illustrative examples.

EXAMPLE 1

*Beta-(beta-diethylaminoethyl-mercapto)-ethyl p-amino-benzoate*

A mixture of 18.5 grams of para-nitrobenzoyl chloride, 18 grams of beta-(beta-diethylamino-ethyl-mercapto)-ethanol and 12 grams of pyridine was dissolved in 250 c. c. of dry benzene. The resulting solution was refluxed on a steam bath for 4 hours. It was then extracted with dilute sodium carbonate solution, following which the benzene with traces of pyridine were removed at 120–125° C./12 mm. The resulting product—beta-(beta - diethylaminoethyl - mercapto)-ethyl p-nitrobenzoate—was reduced in the following manner without further purification.

20 grams of the aforesaid nitro compound were dissolved in 180 cc. of alcohol and reduced at 40 lbs. pressure, using Raney nickel as a catalyst. This produced 14.5 grams of beta-(beta-diethyl-aminoethyl-mercapto)-ethyl p - aminobenzoate which distilled at 201–202° C./0.3 mm.

EXAMPLE 2

*Beta-(beta-diethylaminoethyl-mercapto)-ethyl p-butoxy-benzoate*

To 117 grams of beta-diethylaminoethyl alcohol, dissolved in 200 cc. of chloroform, was added dropwise, and with stirring, 177 grams of thionyl chloride in 100 cc. of chloroform. The reaction mixture was kept at 0° C. throughout the addition by means of an ice salt bath. After the addition was completed the mixture was allowed to come to room temperature over a period of 2 hours, and then the chloroform and excess thionyl chloride were removed under reduced pressure. The residue was treated with 250 cc. of ice cold 50% sodium hydroxide solution, extracted with ether, and the ether extract was dried over sodium sulfate. The ether was removed and the residue distilled under reduced pressure. 100 grams of beta-diethylaminoethyl chloride, distilling at 59–60° C./30 mm., was produced.

39 grams of beta-hydroxyethyl mercaptan was added to a solution of 6.9 grams of sodium in 150 cc. of absolute alcohol. This solution was heated to reflux temperature and 68 grams of beta-diethylaminoethyl chloride was added over a period of ½ hour. 20 minutes after the addition had been completed the alcohol was removed under reduced pressure, the residue washed with water, and the organic layer extracted with ether. Distillation yielded 60 grams of beta-(beta-diethyl-aminoethyl - mercapto) - ethanol boiling at 101–102° C./0.3 mm.

A mixture of 21.2 grams of para-butoxybenzoyl chloride, 18 grams of beta-(beta-diethylamino-ethyl-mercapto)-ethanol and 12 grams of pyridine was dissolved in 250 cc. of dry benzene. The resulting solution was refluxed on a steam bath for 4 hours and the mixture was cooled and extracted with dilute sodium carbonate solution. The benzene solution was dried over sodium sulfate. Distillation of this solution yielded 31 grams of beta-(beta-diethylaminoethyl-mer-capto)-ethyl para-butoxy-benzoate which boiled at 198–200° C./.20 mm. The hydrochloride of this product melted at 72–74° C.

It is to be understood that the foregoing examples may be varied with respect to the individual reactants and the conditions of reaction without departing from the scope of this invention. For example, in place of benzoyl chloride derivatives referred to therein, many other benzoyl chloride derivatives may be employed. These derivatives may be substituted on the benzene ring with radicals such as amino, nitro, alkyl, alkoxy, etc. groups. Where the final product is to be an amino benzoate derivative it may readily be produced as in Example 1 by employing the corresponding nitrobenzoyl derivative and subsequently reducing the nitro group to an amino group. Among the alkyl groups which are contemplated for substitution in the benzene ring may be mentioned the methyl, ethyl, propyl, butyl, amyl, etc. groups. The alkoxy groups which may be substituted thereon are represented by the methoxy, ethoxy, propoxy, butoxy, etc. groups. It is to be understood, of course, that more than one substituent may be substituted on the benzene radical, for example, an alkyl and an alkoxy grouping.

In place of beta-(beta-diethylaminoethyl-beta-mercapto)-ethanol, which is to be reacted with the benzoyl chloride or derivatives thereof, it is to be understood that other aliphatic sulfide compounds may be employed. For instance, instead of the diethylaminoethyl derivative, a related dialkyl-amino-alkyl compound might be used, such as the dimethyl- or dipropyl-aminoethyl derivatives. Likewise, instead of the foregoing group being attached to a hydroxyethyl sulfide radical it may be attached to some other related hydroxyalkyl sulfide radical, such as the hydroxymethyl sulfide or hydroxypropyl sulfide radical.

The compounds of this invention are useful for a wide variety of purposes. They may be used as intermediates or surface-active agents. Furthermore, they are especially adapted for use in the pharmaceutical field and in particular as local anesthetics. For this latter purpose their solutions may be injected into the body or they may be prepared in the form of tablets or ointments. As local anesthetics it is to be understood that the benzoates of beta-(beta-diethylaminoethyl-mercapto)-ethanol are preferred, and in particular the para-amino and para-alkoxy benzoates of the foregoing compounds.

As many apparently widely different embodiments of this invention may be made without departing from the spirit and scope hereof, it is to be understood that the invention is not limited to the specific embodiments hereof except as defined in the appended claims.

I claim:

1. A beta-(beta-dialkylaminoethyl-mercapto)-ethyl alkoxyl-benzoate.
2. Beta-(beta-diethylaminoethyl-mercapto)-ethyl para-butoxy-benzoate.

SOUREN AVAKIAN.

REFERENCES CITED

The following references are of record in the file of this patent:

UNITED STATES PATENTS

| Number | Name | Date |
|---|---|---|
| 1,193,650 | Wildman et al. | Aug. 8, 1916 |
| 1,513,730 | Adams et al. | Nov. 4, 1924 |
| 2,342,142 | Harris et al. | Feb. 22, 1944 |

OTHER REFERENCES

Clinton et al.: "Jour. Am. Chem. Soc.," April 1945, vol. 67, pages 594–597.